May 25, 1965 G. E. MOORE ETAL 3,185,128

SIGHT-GLASS INDICATOR OR THE LIKE

Filed June 6, 1963 2 Sheets-Sheet 1

INVENTORS
GLENN E. MOORE
JAMES L. HUGHES

BY *Kinney & Schenk*

ATTORNEYS

May 25, 1965  G. E. MOORE ETAL  3,185,128
SIGHT-GLASS INDICATOR OR THE LIKE
Filed June 6, 1963  2 Sheets-Sheet 2

INVENTORS
GLENN E. MOORE
JAMES L. HUGHES
BY
Kinney & Schenk
ATTORNEYS

United States Patent Office 3,185,128
Patented May 25, 1965

3,185,128
SIGHT-GLASS INDICATOR OR THE LIKE
Glenn E. Moore, Fairfield, and James L. Hughes, Cincinnati, Ohio, assignors to Dover Corporation, Cincinnati, Ohio, a corporation of Delaware
Filed June 6, 1963, Ser. No. 286,003
7 Claims. (Cl. 116—117)

This invention relates to an improved sight-glass indicator or the like as well as to improved parts for such an indicator or the like.

It is well known that sight-glass indicators have been provided in the past for insertion in fluid lines so that the visual inspection of the indicator will permit the viewer to determine whether the flow through the fluid system is in the proper direction and/or that the flow is of substantially the proper magnitude.

However, many problems exist with prior known sight-glass indicators, such problems being substantially reduced or completely eliminated by this invention in a manner hereinafter set forth.

In particular, one problem of the prior known sight-glass indicators is that the inlet and outlet thereof had to be disposed out of alignment of the vane chamber thereof in order to permit the flow to properly impinge on the vane structure so that different sized indicators had to be utilized for different types of applications.

However, according to the teachings of this invention, an improved sight-glass indicator is provided wherein the inlet and outlet is aligned with the vane chamber thereof and removable deflector means is disposed in the inlet to direct the flow in such a manner that the same impinges on the vane means in a proper manner whereby different deflectors can be utilized with the same indicator to adapt the same to different fluid systems whereby the overall cost of supplying sight-glass indicators for different fluid systems is substantially reduced.

Another problem encountered in prior known sight-glass indicators is that in order to provide a fluid-tight seal between the housing of the indicator and the transparent means or glass parts thereof, the glass transparent means had to be firmly compressed against the sealing gaskets whereby the glass transparent means was readily subject to cracking and the like by dirt being trapped between the glass transparent means and the sealing gaskets as excessive compression pressures could be provided in the prior known indicators.

However, according to the teachings of this invention, an improved sight-glass indicator is provided wherein novel sealing means are provided for the transparent means thereof and whereby the compression between the transparent means and the sealing gaskets of the indicator is controlled so that the transparent means will not crack even though the fluid-tight seal is provided.

A further problem encountered in the prior known sight-glass indicators is that the vane means is so mounted for rotation that the vane means is spaced a substantial distance from the transparent means of the indicator whereby it is relatively difficult to see the flow action on the vane means, especially when dark fluids are passing through the indicator.

However, according to the teachings of this invention, an improved mounting means is provided for the vane means of the sight-glass indicator whereby the vane means are disposed closely adjacent the transparent means thereof so that the flow action on the vane means can be readily viewed even though relatively dark fluid is flowing through the indicator.

Accordingly, it is an object of this invention to provide an improved sight-glass indicator having one or more of the novel features set forth above or hereinafter shown or described.

Another object of this invention is to provide improved parts for such a sight-glass indicator or the like.

Other objects, uses and advantages of this invention are apparent from a reading of this description which proceeds with reference to the accompanying drawings forming a part thereof and wherein.

Figure 2:
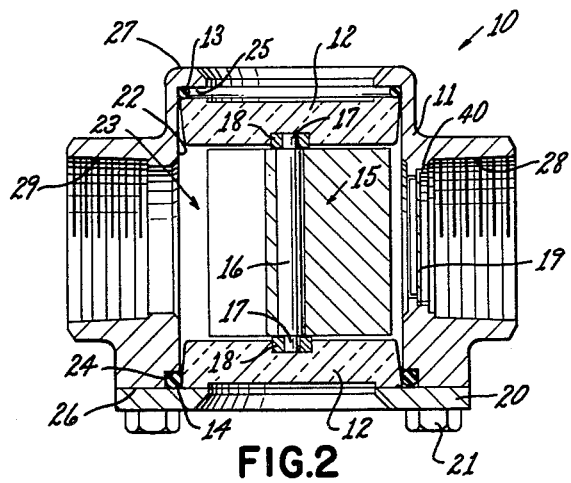
FIGURE 2 is a cross-sectional view taken on line 2—2 of FIGURE 1.
Figure 3:
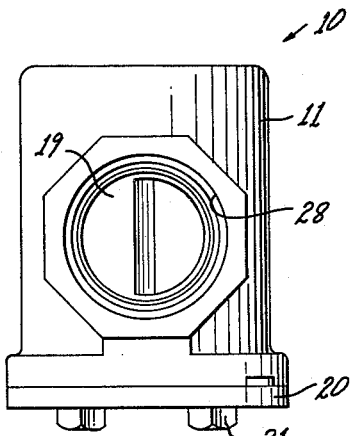
FIGURE 3 is an end view of the sight-glass indicator illustrated in FIGURE 2.

While the various features of this invention are hereinafter described and illustrated as being particularly adaptable for forming sight-glass indicators or the like, it is to be understood that the various features of this invention can be utilized singly or in various combinations thereof to provide other devices as desired.

Therefore, this invention is not to be limited to only the embodiments illustrated in the drawings, because the drawings are merely utilized to illustrate one of the wide variety of uses of this invention.

Referring now to FIGURES 1-4, the improved sight-glass indicator of this invention is generally indicated by the reference numeral 10 and comprises a housing 11, transparent members 12, sealing gasket means 13 and 14, rotatable vane means 15, shaft means 16, spring pin means 17, bushing means 18, flow deflector means 19, cover means 20 and threaded fastening members 21 whereby it can be seen that the sight-glass indicator 10 of this invention is formed from a relatively few parts which are uniquely assembled together in a manner hereinafter described to provide an indicator having many advantages over the prior known indicators in the manner set forth above.

The particular details of the sight-glass indicator 10 of this invention will now be described.

The housing 11 of the sight-glass indicator 10 has a stepped bore 22 passing transversely therethrough to define a chamber 23 in the housing 11 and a pair of shoulders 24 and 25 respectively disposed adjacent the opposed sides 26 and 27 of the housing 11.

The housing 11 has an inlet 28 and an outlet 29 respectively leading to and from the chamber 23, the inlet 28 and outlet 29 being internally threaded to permit the same to be readily coupled to the conduits of a desired fluid system which is to have the flow characteristics thereof indicated by the flow indicator 10 of this invention in a conventional manner.

It should be noted that the inlet and outlet 28 and 29 are respectively aligned with the chamber 23 for a purpose hereinafter described.

Each transparent means or member 12 forms a substantially truncated cone defined by opposed base and apical faces 30 and 31 respectively spaced from each other by a tapering or beveled side wall 32. The front, or base, face 30 of each transparent means 12 is interrupted by a recess 33. The rear face 31 of each transparent means 12 is interrupted by a centrally disposed socket recess 34 adapted to receive a bushing means 18 in the manner illustrated in FIGURE 2.

The transparent means 12 can be formed of any suitable material and in any suitable manner. For example, the transparent means 12 can comprise glass, plastic or the like and the bushing means 18 can be press-fitted into the socket recesses 34, fused therein or secured to the transparent means 12 in any suitable manner.

The shaft 16 is adapted to receive the spring pins 17 in any suitable manner or the spring pins 17 can be formed integrally with the shaft means 16, if desired, the spring pins 17 being adapted to be respectively received in bores 35 formed through the bearing means 18.

The vane means 15 of the embodiment of the sight-glass indicator 10 comprises a substantially cylindrical hub 36 having a bore 37 to allow the hub 36 to rotate on the shaft 16. A plurality of radially disposed vanes 38 are integrally interconnected to the hub 36 of the vane means 15 and are utilized to indicate the direction and/or magnitude of flow through the indicator 10 in a manner hereinafter described.

The sealing gaskets 13 and 14 are O-rings or the like and can be formed of any suitable material, the material of the sealing gaskets 13 and 14 only being dictated by the particular fluid to be utilized with the indicator 10 in order to prevent the same from being corroded by the fluid. For example, in some applications of the indicator 10, the sealing gaskets 13 and 14 can comprise rubber, plastic or the like.

The flow deflector 19 comprises a disc-like structure having a peripheral flange 39 adapted to be press-fitted in a stepped bore 40 formed in the inlet 28 of the housing 11 in the manner illustrated in FIGURE 2, the flow deflector 19 having the disc portion 41 thereof interrupted by an opening 42 passing therethrough in a manner offset relative to the center thereof. For example, the embodiment of the deflector 19 illustrated in the drawing has a substantially semi-circular opening 42 formed therein wherein the chord of the opening 42 is defined by an angularly disposed flange 43, or bevel, which is directed inwardly toward the chamber 23 to tend to direct the flow passing through the inlet 28 downwardly in FIGURE 1 to impinge on the vane 38 of the vane means 15 to cause the vane means 15 to rotate in a clockwise direction in FIGURE 1 to indicate not only the direction of flow but also to tend to indicate the magnitude of flow in a manner well known in the art.

However, it is to be understood that the flow deflector 19 of this invention can be formed in any other suitable manner wherein the opening 42 passing therethrough is merely disposed off center relative to the disc portion 41 thereof so that the flow passing through the flow deflector 19 will be off center relative to the axis of rotation of the vane means 15.

In this manner, by merely changing the flow deflector 19 for another flow deflector having a smaller or larger opening 42 passing therethrough, the indicator 10 of this invention can be utilized in fluid systems having different flow charcteristics so that the indicator 10 will indicate the proper characteristics of the particular system being utilized.

Thus, it can be seen that the same parts of this invention can be utilized for different applications by only modifying the flow deflector 19 thereof whereby the sight-glass indicator manufacturer need not maintain a large number of different indicators to meet the various requirements of its customers.

The cover member 20 has an aperture 44 passing therethrough to be aligned with the recess 33 in the transparent means 12 in a manner hereinafter described. The cover member 20 also has bores 45 passing therethrough to be aligned with threaded bores 46 formed in the side 26 of the housing 11 whereby the threaded members 21 are adapted to pass through the bores 45 in the cover member 20 and be threadedly received by the bores 46 of the housing 11 to detachably secure the cover member 20 against the side 26 thereof.

The method of assembling the various parts of the flow of the sight-glass indicator 10 will now be described.

The sealing gasket 13 is first placed in the stepped bore 22 of the housing 11 against the shoulder 25 thereof, the sealing gasket 13 preferably being of a size to be radially inwardly compressed by the bore 22 adjacent the shoulder 25 so that the sealing gasket 13 has a natural resiliency to cause a sealing relationship against the housing 11 by its pressed-fit relationship therewith.

Thereafter, the rear transparent means 12 is disposed in the chamber 23 against the sealing gasket 13, the rear transparent means 12 having its bushing means 18 secured in the socket recess 34 thereof in the manner previously described.

Subsequently, the vane means 15 is placed on the shaft 16 whereby the vane means 15 can be disposed in the chamber 23 with the rear spring pin 17 thereof being received in the bore 35 of the bushing means 18 of the rear transparent means 12.

The sealing gasket 14 is then disposed in the stepped bore 22 of the housing 11 against the shoulder 24.

Thereafter, the front transparent means 12 is disposed in the stepped bore 22 to receive the forward spring pin 17 in the bore 35 of the bushing means 18 thereof. As the front transparent means 12 is being inserted into the stepped bore 22 of the housing 11, the tapering side 32 thereof progressively and radially outwardly compresses the sealing gasket 14 against the stepped bore 22 of the housing 11 to provide a fluid seal therewith.

Subsequently, the cover member 20 is assembled to the housing 11 by the threaded fastening members 21 whereby as the threaded fastening members 21 are tightened to draw the cover member 20 against the side 26 of the housing 11, the cover member 20 presses against the face 30 of the forward transparent means 12 and compresses the shaft 16 and rear transparent means 12 against the sealing gasket 13 to compress the same against the shoulder 25. However, the degree of compression of the sealing gasket 13 against the shoulder 25 of the housing 11 is limited by the cover member 20 abutting the surface side 26 of the housing 11.

Similarly, as the cover member 20 is drawn against the side 26 of the housing 11, the cover member compresses the gasket 14 against the shoulder 24 of the housing 11. However, the degree of compression of the sealing gasket 14 against the shoulder 24 of the housing 11 is limited by the cover member 12 abutting the side 26 of the housing 11.

Therefore, it can be seen that the compression of the sealing gaskets 13 and 14 is controlled by the cover member 20 so that the gaskets do not place too great an amount of force on the transparent means 12 to tend to crack the same as provided in the prior known sight-glass indicators.

Further, it can be seen that the sight-glass indicator 10 of this invention can be assembled in a relatively simple manner by relatively unskilled labor while still providing an indicator which will not have the disadvantages of the prior known indicators in the manner set forth above.

While one sequence in the steps of assembling the indicator 10 has been set forth above, it is to be understood that the sequence in assembling the sight-glass indicator 10 can be varied while still falling within the scope of this invention.

The operation of the sight-glass indicator 10 will now be described.

Assuming that the inlet 28 and outlet 29 of the sight-glass indicator 10 are respectively connected to conduit means of a fluid system or the like, the fluid tending to flow from the inlet 28 to the outlet 29 of the indicator 11 is directed downwardly in FIGURE 1 by the bevel flange of the deflector means 19 of this invention to cause the same to impinge against the vanes 38 of the vane means 15 at a point below the axis of rotation of the vane means 15 whereby the vane means 15 will rotate in a clockwise direction at a speed depending upon the flow rate of fluid to the indicator 11.

Figure 1:
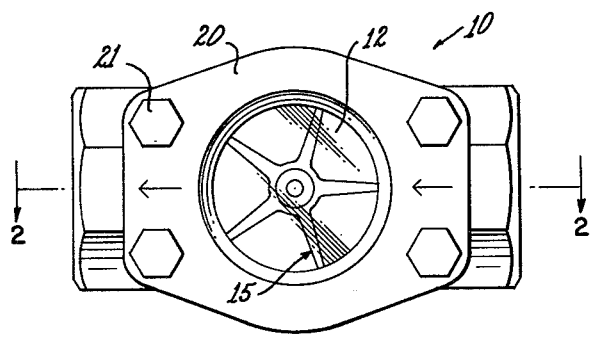
FIGURE 1 is a side view of an improved sight-glass indicator of this invention.

Thus, a person viewing the indicator in FIGURE 1 can determine by the direction of rotation of the vane means 15 whether the flow of fluid through the fluid system is in the proper direction and can determine the magnitude of flow by comparison of the rate of rotation of the vane means 15 to that which should be the normal rotation thereof for the particular fluid system.

Since the bushing means 18 for the vane means 15 are disposed in the recesses 34 of the transparent means 12, it can be seen from FIGURE 2 that the vanes 38 of the vane means 15 are disposed closely adjacent the surfaces 31 of the transparent means 12 so that should a relatively dark fluid be passing through the indicator 10, the motion of the vane means 15 will be readily apparent to an observer of the indicator 10.

Should it be desired to disassemble the indicator 10 in order to clean the various internal parts thereof, it may be found that when the threaded fastening members 21 are removed after prolonged use, the cover member 20 still sticks to the side 26 of the housing 11.

If this happens, the person disassembling the indicator 10 can insert a screwdriver between the cover member 20 and a recessed groove 48 of the housing 11 to pry loose the cover member 20 from the housing 11.

In this manner, the various parts of the indicator 10 can be removed and cleaned. Thereafter, the various parts of the indicator 10 can be reassembled in the manner previously set forth.

While the indicator 10 of this invention has been illustrated and described as having a propeller or paddle wheel type of vane means 15, it is to be understood that the vane means of the indicator 10 of this invention can be modified in any suitable manner whereby the resulting indicator will still have the various novel features of this invention.

Figure 5:
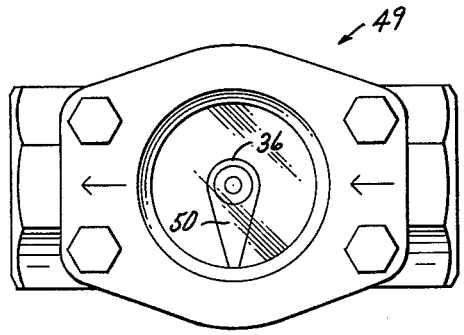
FIGURE 5 is a view similar to FIGURE 1 and illustrates another embodiment of this invention.
Figure 4:
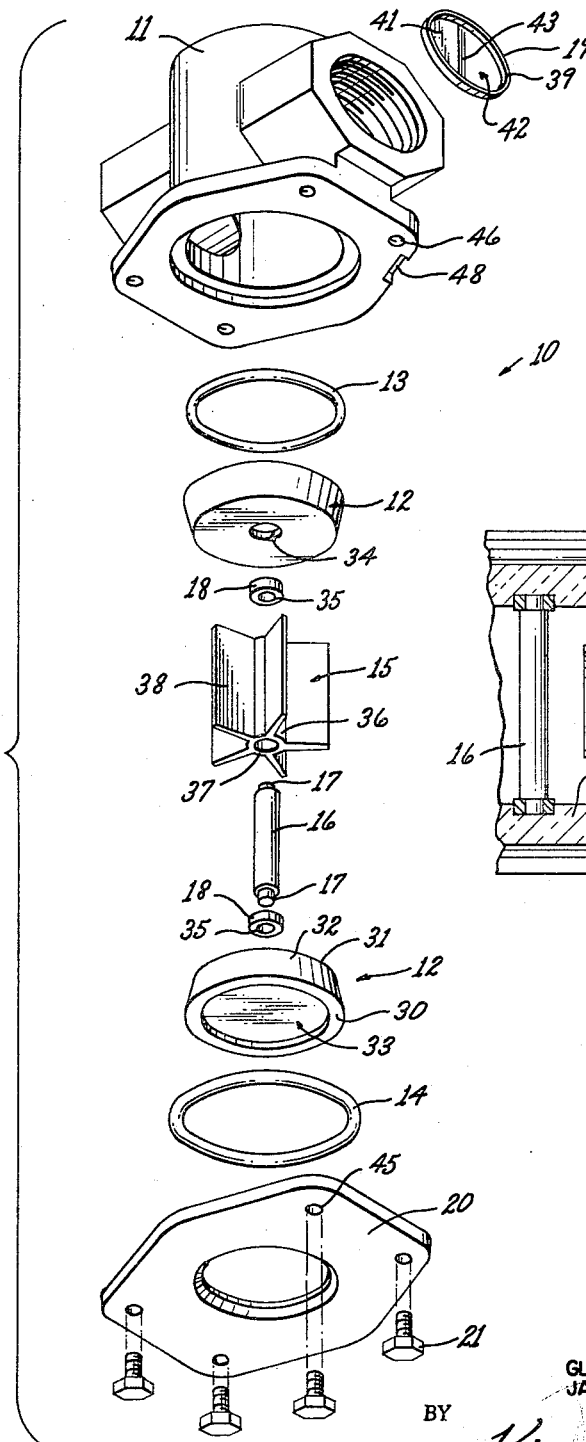
FIGURE 4 is an exploded perspective view illustrating the various parts of the sight-glass indicator of FIGURE 1.

In particular, reference is made to FIGURE 5 wherein another indicator of this invention is generally indicated by the reference numeral 49 and all of the parts thereof are identical to the parts of the indicator 10 previously described except that a flapper type of vane 50 is interconnected to the hub 36 rather than the plurality of radially disposed vanes 38 previously described.

In the operation of the indicator 49, the flapper 50 moves in a clockwise direction in FIGURE 5 as the flow through the indicator 49 is from right to left. However, the flapper 50 merely remains at some angular position in a clockwise direction from the position thereof illustrated in FIGURE 5 to indicate the flow direction of the fluid through the indicator 49 as well as the magnitude of flow by the amount of clockwise movement of the flapper 50.

Figure 6:
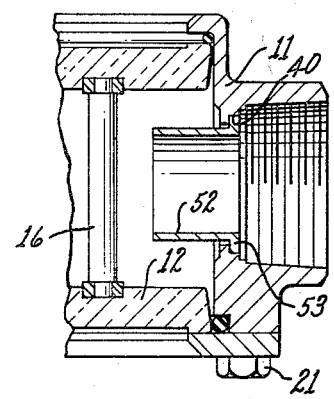
FIGURE 6 is a fragmentary cross-sectional side view illustrating another embodiment of the present invention.

Another embodiment of the invention is shown in FIGURE 6. Here the subject device has been converted to a drip tube indicator by removal of the vanes and the insertion of a hollow cylindrical member 52 into the inlet 28 of the housing 11. The member 52 has an enlarged shoulder 53 which seats in the enlarged stepped bore 40. In this position the hollow cylindrical body extends into the housing 11 so that the end thereof can be viewed through the transparent members 12. This embodiment of the invention is particularly adapted for use with low intermittent flows such as condensate returns.

Therefore, it can be seen that various modifications can be made of the indicator 10 of this invention while the resulting indicator will still come within the scope of this invention.

Further, it can be seen that this invention provides an improved sight-glass indicator as well as improved parts for such a sight-glass indicator or the like.

While the form of the invention now preferred has been disclosed as required by the statutes, other forms may be used, all coming within the scope of the claims which follow.

What is claimed is:

1. A fluid flow indicator comprising a housing body having a bore extending therethrough and opening at opposite ends through opposite sides of the body and forming a fluid chamber, said bore at one open end being bordered by an annular inwardly projecting flange, the said flange forming an inwardly facing shoulder and defining a window opening of materially smaller diameter than the bore, said bore at its other end having a counter-bore forming an annular counter-bore recess providing a shoulder facing outwardly away from said inwardly facing shoulder, axially aligned fluid inlet and outlet ports in said housing body directed transversely of and opening into said chamber, a transparent disc body in and partitioning the chamber forming bore at said one open end, a gasket between said inwardly facing shoulder and said transparent disc and forming a seal therebetween, a ring gasket in said counter-bore recess, a transparent frusto-conical disc extending into said other end of said bore through said ring gasket with the apical end thereof directed into the chamber and having the tapered side thereof engaging and compressing said ring gasket laterally in said recess, a flow indicating vane within said chamber between said discs and comprising an elongate hub disposed in the axial center of the said bore and carrying longitudinally extending radially projecting blades, means positioning the ends of said hub adjacent to and in opposed relation with the centers of said discs for free rotation of said vane between said discs, means secured to the housing body and engaging and pressing said transparent frusto-conical disc inwardly and securing the chamber containing parts in operative position in the chamber and also effecting compression of said gaskets against said shoulders, and means in said inlet port for deflecting in-flowing fluid toward and against the vane blades on one side of said hub.

2. The invention according to claim 1, wherein said means positioning the ends of the hub in said relation with the discs includes a pivot element supporting the vane and carrying pins extending axially of and beyond the ends of the vane hub and engaging against said discs.

3. The invention according to claim 1, wherein said means positioning the ends of the hub in said relation with the discs includes a pivot shaft extending axially in and through said hub and supporting the vane and carrying pins extending axially of and beyond the ends of the vane hub and pressing against said discs and holding the discs in spaced operative relation, and each of said discs has an annular bearing element recessed in the inner side thereof between the disc and the adjacent end of the vane hub and has the adjacent pin positioned therein.

4. The invention according to claim 1, wherein the said means secured to the housing body and engaging said frusto-conical transparent disc comprises a plate having a sight opening therein of a diameter smaller than the base of said frusto-conical disc, the said base of the frusto-conical disc and the plate having corresponding flat surfaces pressing against one another and the flat surface of the plate engaging the ring gasket.

5. The invention according to claim 1, wherein the said flow deflecting means lying in the inlet port is positioned outside of the circular area defined by the wall of the chamber forming the bore.

6. The invention according to claim 1, wherein the said flow deflecting means lying in the inlet port is positioned outside of the circular area defined by the wall of the chamber forming the bore and consists of a flat semi-circular member within an annulus and the annulus being secured in said inlet port with the chordal edge of the semi-circle defined by said member substantially paralleling the said hub of the flow indicating vane.

7. The invention according to claim 6, wherein the said semi-circular member is beveled along the said chordal edge to deflect and guide the inflowing stream as stated.

(References on following page)

References Cited by the Examiner

UNITED STATES PATENTS

| | | | |
|---|---|---|---|
| 1,385,717 | 7/21 | Sams | 116—117 |
| 1,463,174 | 7/23 | Peterson et al. | 116—117 |
| 1,614,530 | 1/27 | Lundquist | 73—228 |
| 1,946,734 | 2/34 | De Lin | 116—117 |
| 2,191,722 | 2/40 | Mulloy et al. | 73—330 |
| 2,580,928 | 1/52 | Kehm | 116—117 |
| 2,650,562 | 9/53 | Bonar et al. | 116—117 |
| 2,675,000 | 4/54 | Ford | 128—214 |
| 2,681,034 | 6/54 | Mannion | 116—117 |
| 2,690,150 | 9/54 | Boos | 116—117 |
| 2,735,300 | 2/56 | Dungan et al. | 73—228 |
| 3,015,300 | 1/62 | Tarbox | 116—117 |
| 3,108,566 | 10/63 | Chatlos | 116—117 |

FOREIGN PATENTS 1,239,115  7/60  France.

LOUIS J. CAPOZI, *Primary Examiner*.